United States Patent [19]
Groff

[11] 4,035,929
[45] July 19, 1977

[54] TEACHING MACHINE

[76] Inventor: James Wilson Groff, P.O. Box 38, Morgan Hill, Calif. 95037

[21] Appl. No.: 603,652

[22] Filed: Aug. 11, 1975

[51] Int. Cl.² .............................................. G09B 5/06
[52] U.S. Cl. ...................................... 35/8 A; 35/9 R
[58] Field of Search ............... 35/5, 6, 8 R, 8 A, 9 R, 35/9 A, 9 B, 9 C, 35 C, 48 R; 40/28.3; 360/71, 74

[56] References Cited

U.S. PATENT DOCUMENTS

| | | | |
|---|---|---|---|
| 3,395,464 | 8/1968 | Leslie et al. | 35/9 A |
| 3,453,749 | 7/1969 | Snedecker | 35/35 C |
| 3,467,834 | 9/1969 | Coleman | 40/28.3 X |
| 3,528,181 | 9/1970 | Arbon et al. | 35/9 A |
| 3,540,133 | 11/1970 | Davidge et al. | 35/9 A |
| 3,579,855 | 5/1971 | Worthy et al. | 35/8 A |
| 3,584,396 | 6/1971 | Hannah et al. | 35/9 A |
| 3,598,927 | 8/1971 | Becker et al. | 35/35 C X |
| 3,605,289 | 9/1971 | Plumly et al. | 35/9 A |
| 3,609,227 | 9/1971 | Kuljian | 35/35 C |
| 3,780,450 | 12/1973 | Podkopaev et al. | 35/9 A |
| 3,795,989 | 3/1974 | Greenberg et al. | 35/9 B |

*Primary Examiner*—Anton O. Oechsle
*Assistant Examiner*—Vance Y. Hum

[57] ABSTRACT

A portable, self-powered teaching machine which provides the student with programmed audio instructional material in conjunction with a monaural or stereo cassette tape recorder/player, such as is available in the classroom. An audio frequency detection and switching circuit in the teaching device responds to control signals recorded within the programmed lesson, resulting in deactivation of the cassette recorder/player at certain intervals. At certain intervals, the student is instructed to insert a coded panel displaying interrogative visual information into a frame on the face of the teaching machine. Upon insertion, coded indicia on the panel establish a singular, correct response circuit in conjunction with sensing means adjacent to the panel. Response switches are contained on the teaching device which, if manipulated correctly by the student in accordance with a correct manner, will cause the cassette recorder/player to again be activated. A student response may be either numerical or alphabetical in nature, in accordance with what is required, and may consist of the identification, in proper order, of the exact letters of a word, portion of a word, a numerical value, or portion of a numerical value without reference to multiple choice identification. Other than prescribing a specific programmed lesson cassette for the student, according to his or her educational needs, little or no teacher involvement is necessary.

8 Claims, 6 Drawing Figures

TEACHING MACHINE

BACKGROUND OF THE INVENTION

1. Field of the Invention

This invention relates to the field of teaching machines and is more particularly directed to portable, self-powered teaching machines which both instruct and interrogate the student by means of magnetic tape and indicia bearing panels which are inserted into the machine.

2. Description of the Prior Art

Prior art within the field of teaching machines is replete with devices, ranging from the uncomplex, U.S. Pat. No. 3,699,668, for example, to the relatively complex, U.S. Pat. No. 3,664,037, for example. The rationale, in most cases, is to offer the student the optimal one-to-one tutorial relationship, whereby the teaching machine temporarily takes the place of the teacher. Any educational assistance which can be gleaned by utilization of teaching machines is educationally attractive, since most teachers are assigned classes of 25 to 35 students and physically cannot interact on a one-to-one basis with each student for the time they wish. Most teachers are acutely aware of each of their sutdents' mastery of the curriculum at any given time, and known exactly what type and how much remedial or enrichment instruction will be most beneficial to the student. The teacher's dilemma, thus, becomes one of finding time to offer this remedial or enrichment instruction, and it is here that teaching machines--whether uncomplex or complex--become the sine qua non in the modern classroom.

Although the prior art reveals a plethora of excellent teaching machines offering audio, visual or a combination of the two modes of instruction, many of the machines suffer from one or more distinct disadvantages. Some are too limited in scope or inflexible in application. Some require special working areas and power outlet availability. Others require special room light conditions, for example, if a slide projector is utilized. Still others are difficult to maintain and require considerable teacher time before, during, or following operation of the device, which weakens the entire concept of automated instruction. Many teaching machines, no matter how effective or sophisticated, require more funds than most school districts can afford. Last of all, a major disadvantage of all teaching machines is the utilization of multiple choice evaluation of what the student has learned. Multiple choice questions cannot be relied upon for a true evaluation of learning without incorporating an element of guesswork, particularly where the total multiple response choices are few in number. It is a rare circumstance in real life when one has four or five readily available selections from which to choose a correct answer to a query, whereby it is known that one of the selections will be correct. A teaching machine offering multiple choice evaluation is, therefore, far from efficient in producing a maximal learning situation, which, of course, should be the goal of any teaching machine.

SUMMARY OF THE INVENTION

The present invention contemplates a teaching machine which is capable of presenting recorded instructional material to the student in a sequential, programmed manner. The present invention also contemplates means which pace the student during presentation of instructional material, and which interrogate the student's mastery of said material.

More particularly the invention consists of audio and power control circuitry which, when utilized in conjunction with an inexpensive monaural or stereo tape recorder/player, instructs the student in remedial or enrichment material without teacher intervention. The invention provides audio detection and switching means so sentence reads "The invention provides audio detection and switching means so sentence reads "The invention provides audio detection and switching means which respond to tone control..." which respond to tone control signals and periods of silence incorporated within the recorded lesson. These controls are provided to deactivate the playback mechanism of the tape recorder/player at prescribed, predetermined intervals and, thus, determone the pace at which the instructional material is presented. Provision is also made to deactivate the recorder/player in the event the student attempts to circumvent any of the sound control signals by reducing the volume of his associated recorder/player.

Interrogation circuitry is provided by way of panels which contain, on one side, a key question which samples the student's mastery of the material already presented. The other side of the panels contain coded indicia which, when inserted into the teaching machine, allow the student to reactivate the recorder/player and, thus, continue the lesson, if a correct answer is chosen and the appropriate numerical or alphabetical response switches are manipulated. Since a recorded lesson does not continue until the student manipulates appropriate response switches, the student also retains a measure of his or her control over lesson pacing. The student may also elect to review or continue the lesson, if a question cannot be answered at any point within the lesson.

In accordance with established principles of pedagogy, the present invention also contemplates the utilization of consumable or non-consumable workbooks or activity sheets in coordination and conjunction with each recorded lesson to offer visual continuity and reinforcement of the audio instructional material which is presented.

It is, therefore, the object of the present invention to provide a teaching machine which can capably instruct on a one-to-one basis students at all grade levels and in all subject matters utilizing programmed audio instructional material as a prime avenue of communication.

It is a further object of the present invention to provide a teaching machine which can apprise the student of his mastery of the instructional material presented in a manner that does not necessarily require the stereotyped "mulitiple choice" format. Because of the invention's novel alphanumeric circuitry, student responses can be keyed to words, abbreviations, and numerical values without listing "multiple choice" answers from which to select.

It is a further object of the present invention to provide a teaching machine which is portable, light in weight, compact, and self-powered, so that it can be utilized silently at the student's own desk under normal lighting conditions.

It is a further object of the present invention to provide a teaching machine which requires no teacher time in setting up or dismantling equipment, correcting lessons completed on the machine, and monitoring or manipulating the machine. Other than prescribing a specific, commercially prepared, programmed lesson cassette for the student, according to his or her educational needs, little or no teacher involvement is necessary.

It is a further object of the present invention to provide a teaching machine which is low in power consumption, and which is relatively uncomplex in construction and operation. As a corollary, the present invention operates in concert with inexpensive monaural or stereo cassette tape recorder/players which are available in most modern classrooms.

Other objects and advantages of the present invention will be more readily understood from the following detailed description when read in conjunction with the accompanying drawings which illustrate the invention.

DESCRIPTION OF THE PREFERRED EMBODIMENT

Figure 1:
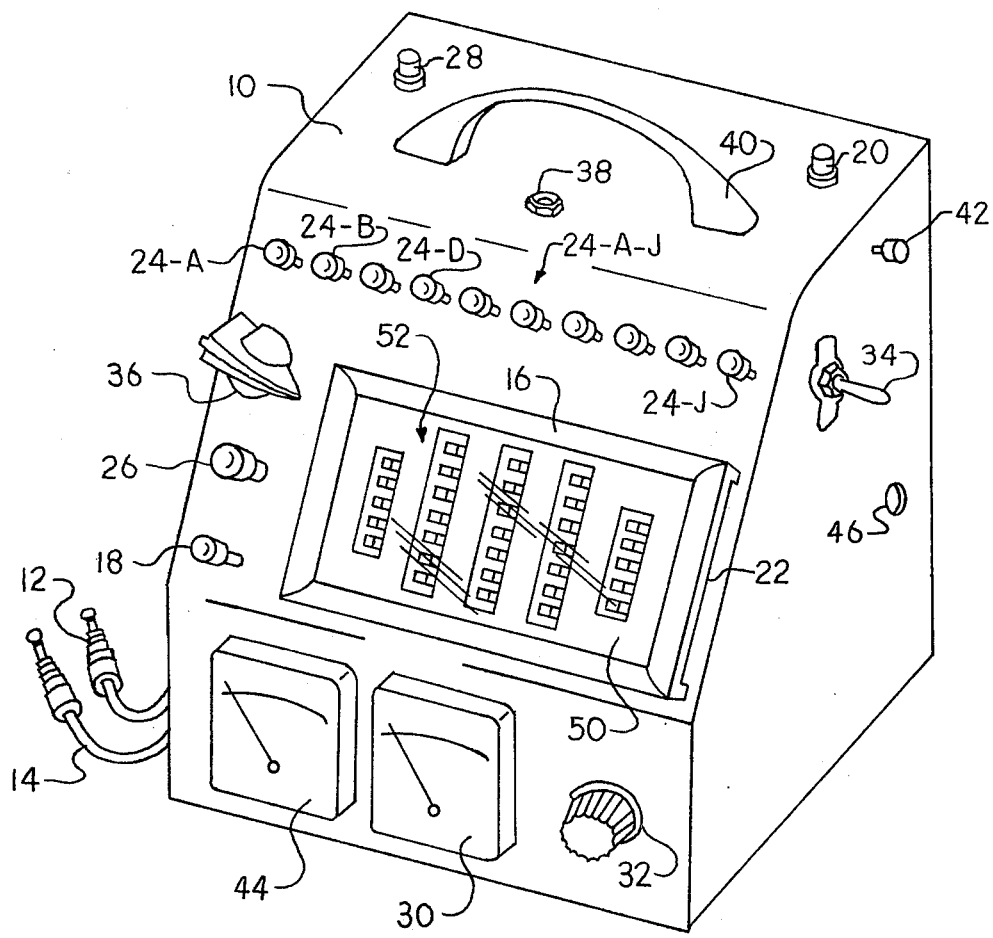
FIG 1 is a perspective view of the teaching machine of the present invention.

Referring first to FIG. 1, the teaching machine is enclosed in a sloping cabinet, or housing, 10 which positions the most frequently used control components on or near the face of the machine. Extending from the left side of the teaching device is a short cable and plug 12 which, when inserted into the "earphone" jack of any standard monaural cassette tape recorder/player, connects the audio output of the recorder/player to the audio input of the teaching machine. An additional short cable and plug 14 are provided to be inserted into the "remote" power jack of the cassette recorder/player. The remote power control output of a recorder/player is thereby connected to the remote power control input of the teaching machine. When a cassette recorder/player is thus connected to the teaching machine, it will be in close juxtaposition to the teaching device and on the opposite side from which interrogation panels are inserted into a frame 16. Interrogation panels, as used in conjunction with a preferred embodiment of the present invention, are defined as small rectangular-shaped panels of a rigid material which display a question or problem on one side and contain coded depressions on the opposite side. These interchangeable panels will be described in detail later in conjunction with FIG. 2.

Once the cassette recorder/player, which contains a programmed lesson cassette and which has been switched to its "on," playback mode, is connected to the teaching machine, the teaching device is turned on by depressing an on/off power switch 18. When this is done, a pilot light 20 which is positioned on the top right side of the teaching machine will be illuminated. At this point the remote power control contacts of the teaching machine will be open, causing the cassette recorder/player to remain inoperative. In order to achieve cassette playback, a "null" panel must be temporarily inserted into frame opening 22 and, hence, into the frame. The null panel is similar to the interrogation panel, except that it does not display a question or problem. Its reverse surface contains three shallow depressions which allow the cassette tape recorder/player to be activated by a given and known manipulation of the response switches. For the present invention, this given manipulation is always "zero." The intended purpose of the null panel is similar to that of a key, i.e., to allow the cassette recorder/ player to be activated at the beginning of each lesson, and to reactivate the recorder/player in the event the student cannot or does not wish to answer a question or problem posed by an interrogation panel. Because of its nature, it is contemplated that a null panel will be kept in a central location within the classroom when not in immediate use by a student. It is further contemplated that this central location might well be the teacher's desk.

Ten alphanumeric response switches 24-A-J are provided which are positioned near the top of the teaching machine above the frame. With the null panel in place within the frame and by depressing "zero" alphanumeric switch 24-J, followed by depression of answer switch 26, playback circuitry of a cassette recorder/player is actuated so that a taped lesson can be heard through headphones which are plugged into an appropriate jack (not shown) provided on the left side of the teaching machine. Simultaneously, pilot light 20 will be deactivated and pilot light 28, which is positioned on the top left side of the teaching machine, will be illuminated. Since pilot light 28 is illuminated when the playback mechanism of a tape recorder/player is operating, and pilot light 20 is illuminated when the teaching machine has de-energized a recorder's playback mechanism, it is contemplated that pilot light 28 be green in color (indicating a "go" condition) and pilot light 20 be red in color (indicating a "stop" condition). The pilot lights are provided to give the teacher a continuous visual means of ascertaining whether a student using the teaching machine is receiving audio information from a programmed lesson cassette or is involved in making a response to material already presented.

One a cassette recorder/player has been activated, the recorder's volume control must be adjusted so that VU meter 30 indicates a volume peak level of zero db or slightly above. If the recorder/player volume is set too low, sound sensitive circuitry provided in the teaching machine will cause the recorder/player to be deactivated after a brief period of time. The reason for this provision will become apparent when frequency sensitive circuitry of the present invention is hereafter described. In order to facilitate proper volume setting by the student, it is contemplated that each programmed lesson cassette will commence with a brief standardized test tone of such a frequency which will not affect the teaching device's frequency sensitive circuitry. At any time the student may utilize a volume control 32 provided on the teaching machine to adjust the volume of his headphones to a comfortable and desirable level. A monaural-stereo switch (not shown) is provided on the teaching machine so that either monaural or stereophonic headphones may be used.

it is contemplated that the student will be admonished to return the null panel to its central classroom location after the cassette recorder/player playback mechanism has been activated by utilization of the panel. During the brief period when the student is away from the teaching machine, the device is maintained in a hold condition by manual activation of a hold switch 34 provided on the upper right side of the machine. Activation of this switch causes the recorder's playback mechanism to be de-energized without allowing the teaching machine's sound sensitive circuitry to switch the device to a stop mode. The teaching machine's hold circuitry will be explained in detail later in conjunction with FIG. 4 and 6. Once the null panel has been returned, the hold switch is once again moved to its "off" position.

After the test tone and at the beginning of each programmed lesson, the student will be given instuctions, either on a tape recording or in a workbook or activity sheet which accompanies a taped lesson, to set mode switch 36 to a specific position. In the present invention, three positions are provided. The purpose of the mode switch is to dissuade the student from memorizing coded depressions contained on the reverse side of various interrogation panels. Function and circuitry of the mode switch will be described in detail hereafter with reference to FIG. 4.

At certain intervals within a programmed lesson, the student will be instructed to insert a numbered interrogation panel into a frame on the face of the teaching machine. Following an explanation of a question or problem posed by the panel, the teaching machine's frequency sensitive circuitry responds to a control signal recorded within a programmed lesson tape and, thereby, causes the cassette recorder to shut off. Simultaneously, pilot light 28 will be deactivated and pilot light 20 will be illuminated. The purpose of this function is, of course, to discontinue the presentation of recorded instructional material so that the student can be interrogated concerning his or her understanding and mastery of said material. It should be appreciated that control signals and subsequent stoppage of the recorder/player can be effective in pacing the student in a way that prevents the presentation of instructional material which the stuent dos not understand. The student also maintains a measure of his own pacing, since there is no time limit on how much time is utilized in responding to a particular question or problem posed by an interrogation panel. It is contemplated that a certain amount of pencil work may often be required in an accompanying workbook or activity sheet before a correct response can be determined.

The student's response is communicated to the teaching machine by manipulated of one or more alphanumeric switches 23-A-J. These switches are numbered consecutively, from left to right, 1 through 9. Alphanumeric switch 24-j on the far right is numbered zero, and, as has been previously described, is also used in conjunction with a null panel. The switches also carry alphabetic identification, so that each of the ten switches is associated with a letter of the alphabet. Switch 24-J, for example, can be labeled "Y,Z," as well as the digit 0. If, for example, the student is asked to compute the sum of 42 + 28 + 54, the correct response (124) can be directly communicated to the teaching machine by depressing switches 24-A, 24-B, and 24-D. Larger numerical values can also be accommodated as shown in the following example: "Find the difference between 5,720 and 4,596. Answer by giving the first and last two numbers of your difference." Since the student's computation results in the answer 1,124, he would again respond by depressing switches 24-A,24-B, and 24-D in the proper order. By manipulating the alphanumeric switches in conjunction with their alphabetic identification, words and abbreviations are communicated to the teaching machine. Switch 24-A can, for example, be labeled A,B,C, and switch 24-D can be labeled J,K,L. If the interrogation panel were to display the following: "Think of another word that can be used in place of 'fire' or 'flame.' Use the first, second and fourth letters of the word for your answer," the student would depress switches 24-A, 24-D, and 24-J to communicate $b, l, z$ for the word "blaze."

The alphanumeric circuitry of the present invention can also be used to respond to a conventional 1, 2, 3, 4, or 5 multiple choice format of answer selection, with up to nine single digit choices offered for selection. Although the alphanumeric circuitry of the present invention provides for one, two and three letter or digit responses, it is contemplated that the maximum number of letter or digit responses could be increased in number. As will be explained hereafter, the alphanumeric switches must be manipulated in proper sequence in order to reactivate a cassette recorder/player and, thus, continue a lesson. If a correct alphanumeric response has been made, answer switch 26 must additionally be depressed to set the recorder/player playback mechanism in motion. Simultaneously, pilot light 20 will be deactivated and pilot light 28 will be illuminated. At this point the interrogation panel is removed from the frame 16 in readiness for a new panel, and the same procedure is repeated for the remainder of the lesson.

In the event the student cannot answer a question, he may request assistance from the teacher. If the teacher wishes, a small earphone can be temporarily plugged into a monitor output 38 provided atop the teaching machine so that audio material reproduced through the student's headphones can also be heard by the teacher. The student may elect to review a portion or all of a programmed lesson by simply rewinding and replaying the lesson tape, or he may elect to skip a response to a particular question or problem and continue on with the remainder of the lesson. In the latter case, a null panel must be utilized to reactivate the cassette recorder/player.

When a programmed lesson has been completed, the student can easily return the teaching device to its storage location in the classroom. The teaching machine is highly portable and can be readily carried by a handle 40 which is provided on top of the machine. It is contemplated that the teacher will appoint a student monitor to test the condition of the rechargeable batteries contained within the teaching machine at the end of the class day. This can be accomplished by depressing battery test switch 42 while viewing voltmeter 44 to determine battery voltage. If battery recharge is necessary, a 120 VAC adapter/battery charger is plugged into external power input 46 and the teaching machine recharged overnight.

A preferred embodiment of the present invention utilizes sealed nickelcadmiun secondary cells rather than the more conventional alkaline or carbonzinc primary cells because of their long service. Five C cells (not shown) are connected in series to comprise a battery which has a rated capacity of 1 ampere-hour and which yields 6.25 VDC. The cells have safety vents and are charged at a rate not exceeding 100 milliamperes (0.1 capacity) for a period of 14 to 16 hours. Because of the teaching machine's low power requirements, it is anticipated that nickel-cadmium cells would need to be replaced only infrequently. If the cells are recharged when necessary, and, thus, not allowed to undergo deep discharge, battery life may approach 1000 charge-discharge cycles. In the event the teaching machine is not to be moved about the classroom, batteries can be eliminated and the machine operated at one location with continued use of an inverter which is plugged into the building AC power source.

Figure 2:
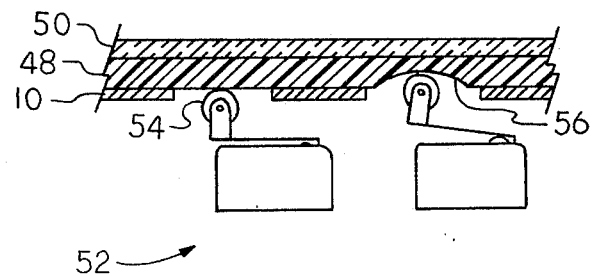
FIG. 2 is a fragmentary view of a section of an interrogation panel to be used in the teaching machine, illustrating the panel's relationship to two roller lever snap-action switches.

Further understanding of the teaching machine's construction and operation can be enhanced by next referring to FIG. 2 in conjunction with FIG. 1. The fragmentary view illustrates a section of an interrogation panel 48 as it is utilized to open or close a plurality of roller lever snap-action switches which are positioned below a panel when the panel is inserted into the frame 16. The interrogation panel is of a width which passes easily through frame opening 22, and yet fits snugly into the frame. In this position, the interrogation panel is sandwiched between the sloping cabinet surface 10 and a layer of non-glare glass 50. The roller lever snap-action switches 52 are positioned immediately below the cabinet surface so that a portion of each switch's roller 54 extends into the frame chamber through openings in the cabinet surface. The interrogation panel is constructed of a rigid material, such as plastic, to insure durability and is of sufficient thickness to allow for several shallow depression 56 extending slightly below the panel's surface. Panel length is generous enough to allow the panel to extend slightly beyond the frame and right edge of the teaching machine so that the fingers can easily grip the panel for removal from the frame.

Figure 3:
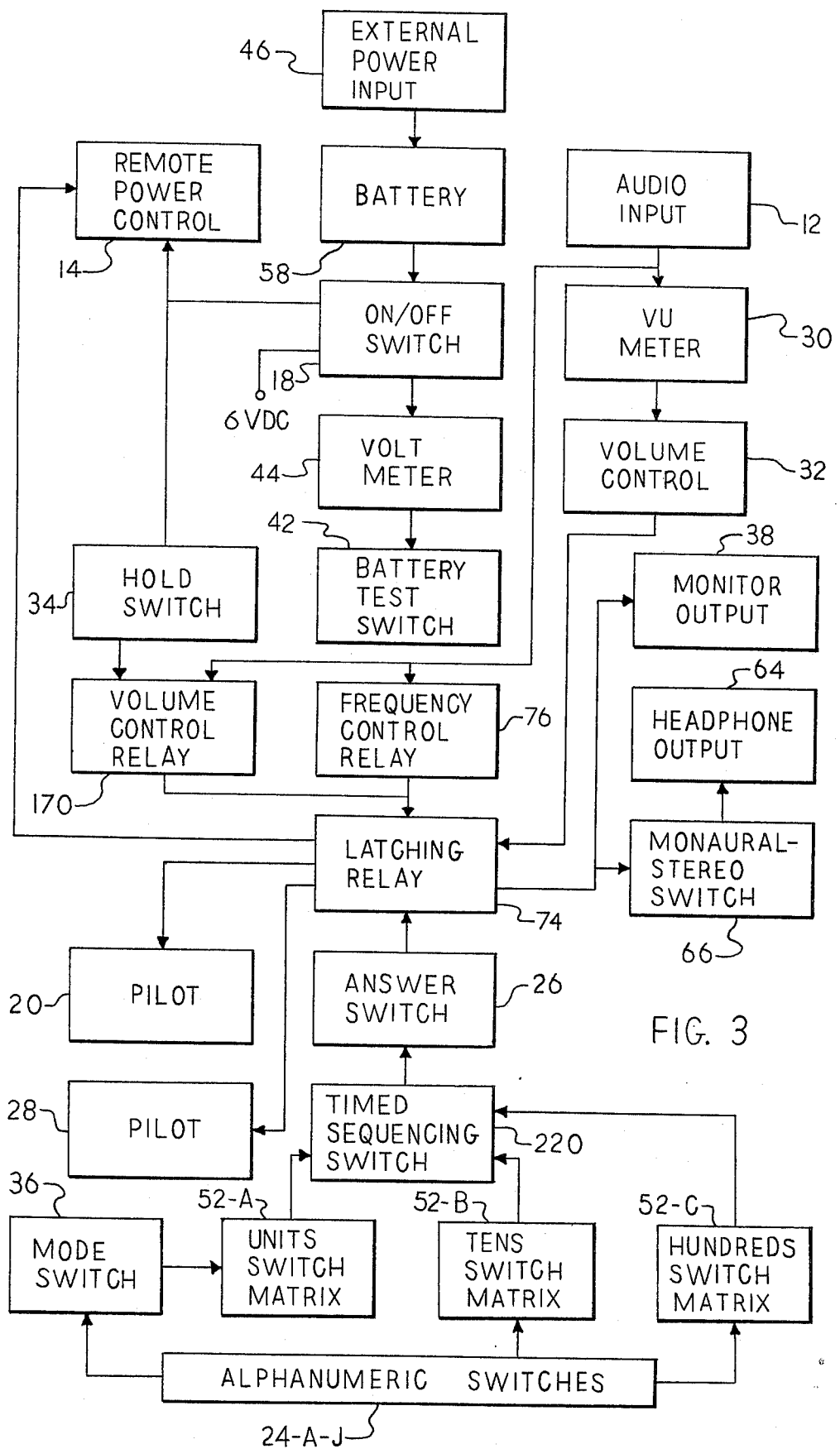
FIG. 3 is a block diagram of the teaching machine illustrating the interrelationship of the machine's basic components.

FIG. 2 illustrates two snap-action switches which are causes to be momentarily open or closed by an interrogation panel which, depending on the absence of shallow depressions in its surface, depresses the upward spring-biased levers of the switches. Since the switches are normally closed, the snapaction switch on the left will be in an open position due to pressure exerted on its lever by an interrogation panel. The snap-action switch on the right will be closed, since the interrogation panel contains a depression which is registered directly above the roller and lever of the switch, thus allowing it to return to its normally closed position. It will, therefore, be appreciated at this point that a combination of components, consisting of an interrogation panel, snap-action, alphanumeric and answer switches, is utilized to actuate the remote power control of a cassette recorder/player in a basic AND gate configuration. The roller lever snap-action swithes are mounted on a printed circuit board in three discrete circuit matrices of ten switches each. In this way, the insertion of an interrogation panel partially completes a circuit to the coil of a latching relay (shown in FIG. 6) within the teaching device, which, in turn, actuates the tape recorder/player playback mechanism. FIG. 3 illustrates the relationship of snap-action switch matrices 52-A, 52-B, and 52-C to the alphanumeric switches, latching relay and other components of the teaching machine.

Figure 4:
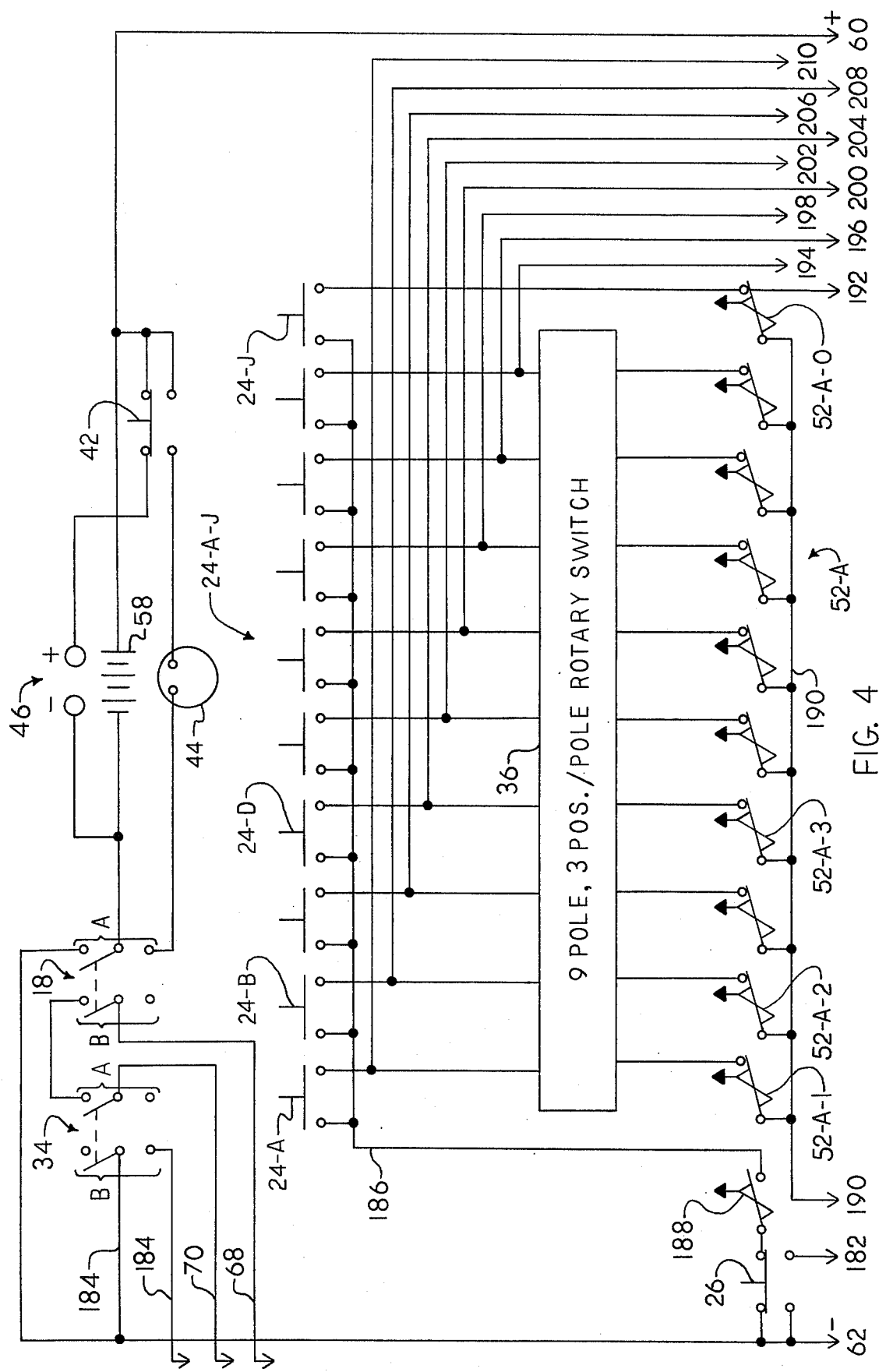
FIG. 4 is a schematic circuit diagram showing the power input and battery supply, voltmeter, battery test switch, on/off switch, hold switch, alphanumeric switches, mode switch, answer switch, and units switch matrix, forming a part of the block diagram illustrated in FIG. 3.
Figure 5:
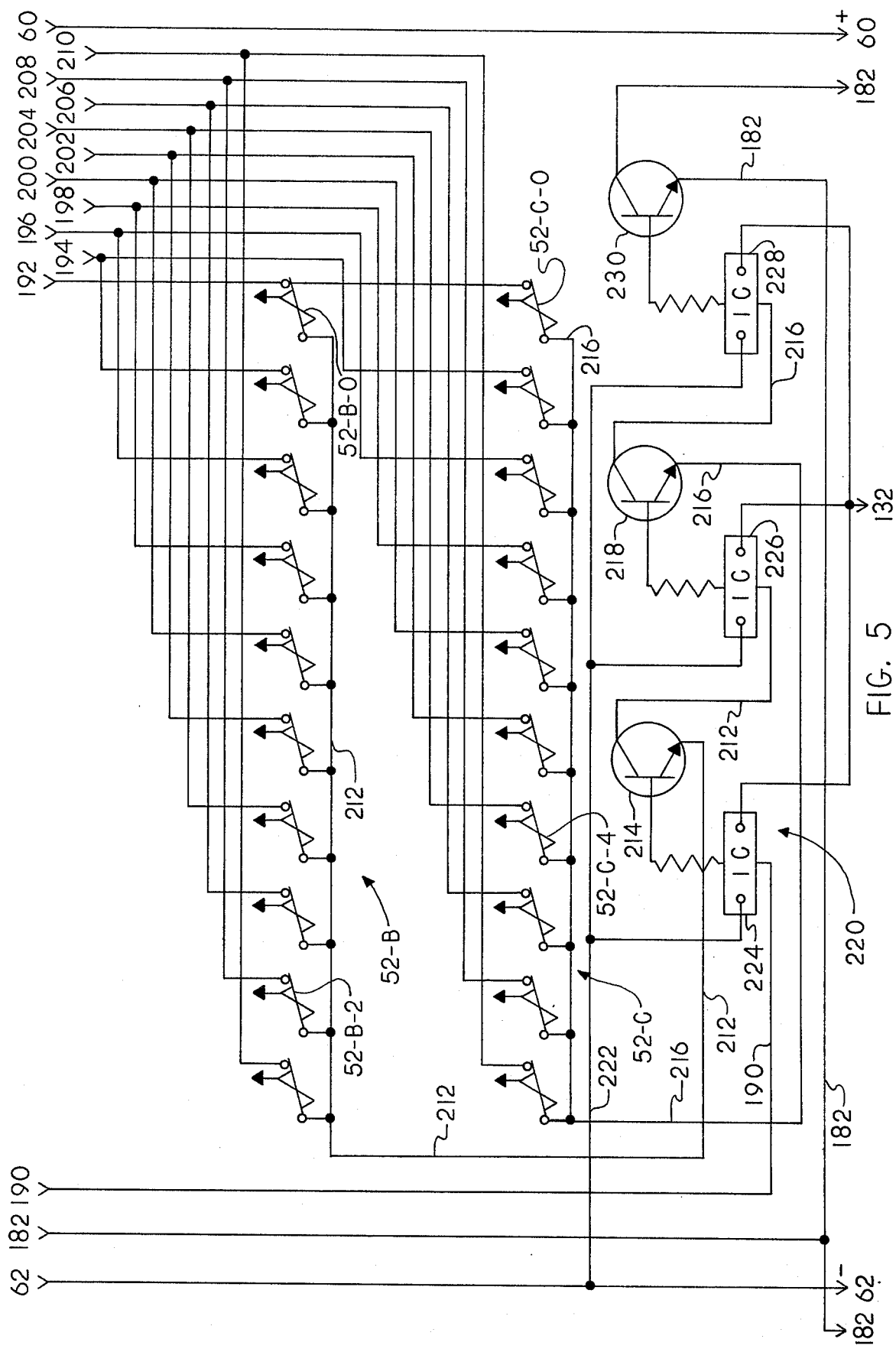
FIG. 5 is a schematic circuit diagram showing the tens and hundreds matrices, and timed sequencing switch circuit, forming a part of the block diagram illustrated in FIG. 3.
Figure 6:
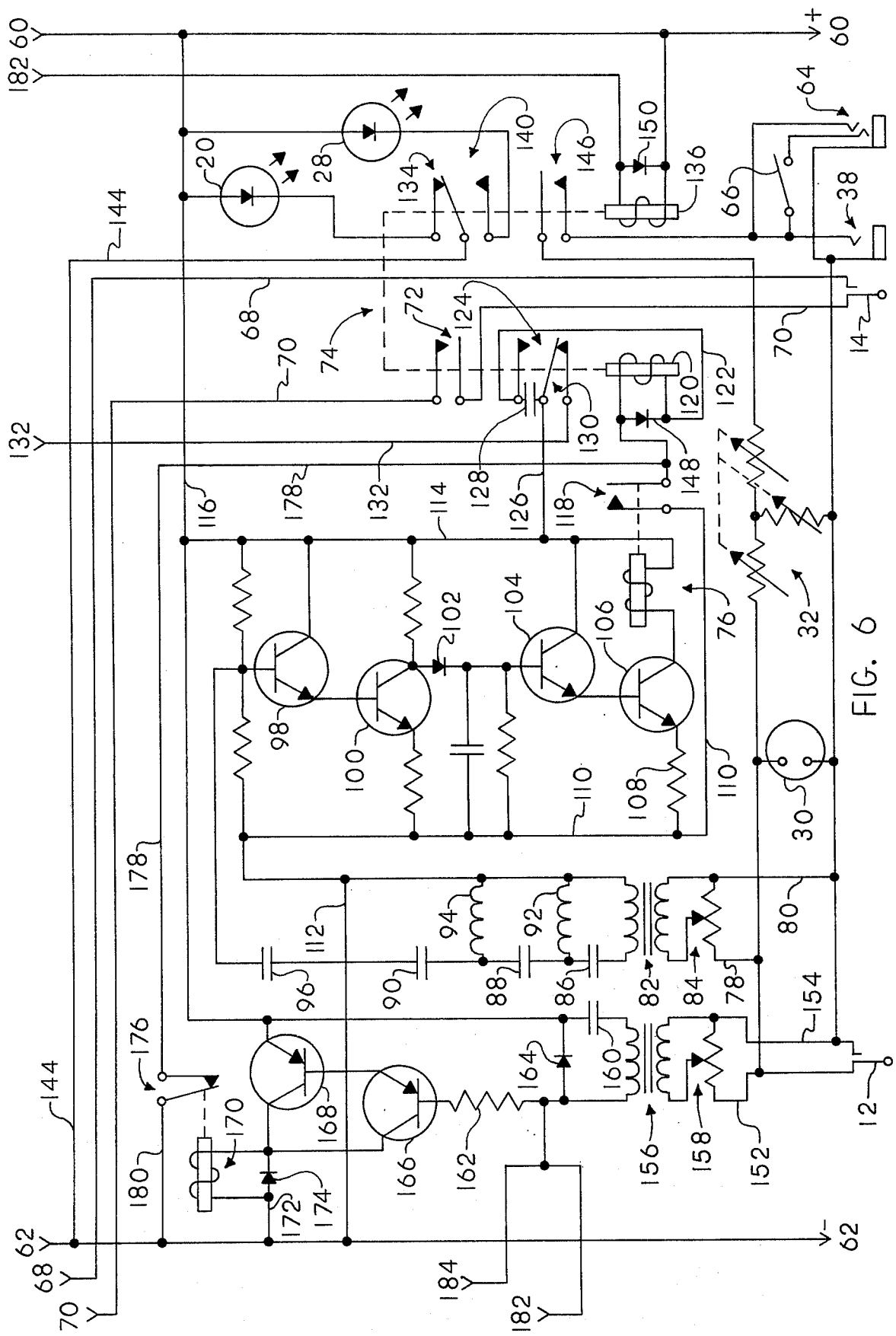
FIG. 6 is a schematic circuit diagram showing the volume control relay circuit, frequency control relay circuit, latching relay, pilot lights, audio input, VU meter, volume control, remote power control input, monitor output, monaural-stereo switch, and headphone output, forming a part of the block diagram illustrated in FIG. 3.

FIGS. 4, 5, and 6 are schematic diagrams illustrating the complete circuitry of a preferred embodiment of the present invention. The DC power supply for the teaching machine is shown in FIG. 4, and is continued in FIGS. 5 and 6 showing polarity in relationship to the various components. When a line must be continued from one FIGURE to the next, it is appropriately labeled near its arrowed plug and respective female connector. Various components which are again referred to and which have been previously described are labeled with the same reference characters.

Referring first to FIG. 4, an external power input 46 is connected in parallel to a battery 58 so that power supply line 60 is positive with respect to power supply line 62 which is negative. This arrangement provides the teaching machine with a DC power supply from its self-contained battery or from an AC adapter. With the battery in place, battery charge is accomplished by utilizing an AC adapter/battery charger. The positive side of external power input 46 is connected through a normally closed circuit of a momentary, two-circuit push buttom switch 42 to power supply line 60. The negative side of external power input jack 46 is connected through circuit A of a double-pole, double-throw switch 18 to voltmeter 44 or power supply line 62. The voltmeter is, in turn, connected through the normally open circuit of push button switch 42 and, thence, to a common terminal between the positive external power input and power supply line 60. With this arrangement, battery voltage can be tested via the voltmeter only when the teaching machine is turned off and when a battery test switch 42 is depressed.

Since the positive external power input is taken out of circuit when the battery test switch 42 is depressed, only battery voltage can be monitored. In addition, the student will be discouraged from attempting to actuate the battery test circuit during the course of a lesson, since the test circuit cannot be actuated when the teaching machine is operating. Sufficient resistance is incorporated within voltmeter 44 to effectively simulate a normal load presented to the battery 58 when the teaching device is operative. Since a voltage drop of one volt or less for five nickel-cadmium cells in series indicates the need for battery recharge, it is contemplated that the voltmeter be marked with an appropriate scale warning: a red scale below 5 volts, for example.

Referring now to FIG. 6, plugs 12 and 14 are provided to be inserted into the "earphone" and "remote power" jacks of any standard cassette recorder/player, and, thus, constitute the teaching machine's audio input and remote power control respectively. Audio input 12 serves to channel sound reproduced by a recorder/player through VU meter 30 and volume control 32 to monitor output jack 38 and headphone jack 64. A monaural-stereo switch 66 is provided to connect or disconnect the ring of a third conductor of jack 64 so that either stereophonic or monaural headphones may be used to correctly reproduce the recorder/player's monaural signal.

Power available to a cassette recorder/player's playback mechanism is controlled by plug 14 which terminates a loop circuit comprised of line 68 and line 70, which passes through three series switches: 18-B, 34-A, and 72. As will be appreciated, the playback mechanism of a tape recorder/player will be inoperative if any of the series switches are open. Switch 72, which comprises one set of contacts of a dual coil latching relay 74, deactivates the recorder/player in response to control signals recorded within a taped lesson so that the student can respond to programmed lesson material which has been presented. Circuit B of switch 18, which is illustrated in FIG. 4, is provided to simultaneously deactivate a recorder/player when the teaching device is turned off. The purpose of this control is to assure that the cassette recorder/player playback mechanism will be immediately deactivated in the event the student is interrupted and turns off the teaching machine. In this way, the student's "place" within a recorder lesson will not be lost. Circuit A of hold switch 34 further controls line 70 by deactivating a tape recorder/player playback mechanism when the hold switch is positioned in its "on" mode. The purpose of this third control switch is to deactivate the recorder/player when the student must leave the teaching device in order to return a null panel. In summary, the cassette recorder/player will be deactivated in response to the following: (1) a control signal recorded within a programmed lesson tape, (2) turn-off of the teaching device, and (3) positioning of the hold switch to "on."

Again referring to FIG. 6, a frequency control relay 76 is parallel connected to audio input 12. Circuitry of the frequency control relay filters out sound within the human speech spectrum through the utilization of a high or low pass filter network, allowing only tone control signals recorded at certain intervals within a taped lesson to reach the amplification and switching components of the relay. Frequency control relay 76, in turn, causes latching relay 74 to open switch 72, thereby deactivating the playback mechanism of a tape recorder/player. The recorder/player will remain inoperative until the student communicates a proper response through alphanumeric and answer circuitry, which will be described in detail hereafter.

The audio frequency filter network illustrated in FIG. 6 is high pass, comprised of inductors and capacitors selected to provide attenuation of all frequencies below 5 kHz. Speech sound recorded within a monaural taped lesson will, therefore, be filtered so that only a tone control signal of 5 kHz or higher causes frequency control relay 76 to be actuated. It will be appreciated that filters and corresponding tone control signals both above and below the human speech spectrum can be utilized in the teaching device. For example, a low pass filter of approximately 100 Hz and corresponding low frequency contol tone of 100 Hz or less could be utilized in place of the 5 kHz high pass filter and tone control signal. Because of the rather poor frequency response exhibited by most inexpensive cassette recorder/players which would be likely to be utilized in conjunction with the teaching machine, it is contemplated that audio frequency filters and accompanying tone control signals utilized with the device would be selected to be as close to the human speech spectrum as possible, i.e., 300 Hz − 4 kHz. It is also contemplated that a filter network could be eliminated, if two-channel (stereophonic) recorder/players were widely available in the classroom. No filter would, of course, be necessary if human speech were reproduced on one channel, and tone control signals reproduced on a discrete, second channel which is directly coupled with circuitry of a control relay. A preferred embodiment of the present invention, however, illustrates a teaching machine which is designed to operate in conjunction with low fidelity monaural cassette recorder/players. Although a tone control signal of the present invention can be heard by the student, the signal is too short in duration to cause discomfort or distraction.

Leads 78 and 80 are parallel connected to audio input 12, allowing an audio signal to be transferred by an audio transformer 82 to a high pass filter network. A trimmer potentiometer 84 is provided at the circuit input to allow for sensitivity adjustment. Capacitors 86, 88 and 90 readily conduct a 5 kHz tone control signal to input capacitor 96, while inductors 92 and 94 block lower frequencies, Amplification and switching circuitry for frequency control relay 76 is comprised of four NPN transistors arranged in two pairs of the well-known Darlington double-emitter follower configuration. It will be appreciated that high amplification and sensitivity of the circuit is necessary because of the poor frequency response exhibited both above and below the human speech spectrum (300 Hz − 4 kHz) by inexpensive monaural cassette recorder/players likely to be used in conjunction with the present invention. The tone control signal is amplifier by transistors 98 and 100 and is subsequently rectified by diode 102, which is connected between the collector of transistor 100 and the base of transistor 104. Transistor 104, in turn, amplifies the switching signal, which forward biases transistor 106 into conduction, causing the coil of sensitive relay 76 to be energized. Power is supplied to the coil of relay 76 through switching transistor 106, resistor 108, line 110, and line 112 to negative power supply line 62, and through line 114, and line 116 to positive power supply line 60.

When sensitive relay 76 is caused to be energized by a tone control signal, normally open switch 118 is closed, thereby energizing latch coil 120 of latching relay 74. Since line 70 of the cassette recorder/player remote power control circuit is controlled at one point by switch 72, which comprises one set of contacts of coil 120 of latching relay 74, a cassette recorder/player is, thus, deactivated by a tone control signal recorded within a programmed lesson tape recording. Power is supplied to latching relay coil 120 through switch 118, line 110, and line 112 to negative power supply line 62, and through line 122, switch 124 (comprising a set of SPDT contacts of relay coil 120 and shown in its latched position), line 126, line 114, and line 116 to positive power supply line 60.

A capacitor 128 is connected between the fixed contact and wiper arm of switch 124 in a "pulse stretching" configuraton to assure that relay coil 120 is effectively energized, since the positive side of the circuit is self-interrupting when the coil is energized. Switch 130, which comprises one set of contacts of latching coil 120 of latching relay 74, controls power supplied to a timed sequencing switch, which will later be described with reference to FIG. 5, through line 126, line 114, line 116, positive power supply line 60, and line 132.

Switch 134, which comprises one set of contacts of release coil 136 of latching relay 74, controls illumination of light-emitting diode 20. This diode will be illuminated whenever relay 74 is in the latched position, which, through switch 72, causes a cassette recorder/player to be inoperative. The light-emitting diode, which contains a current limiting resistor (not shown), is utilized in place of a conventional filament incandescent pilot lamp to extend service life and to conserve battery power. Switch 140, which comprises one set of contacts of release coil 136 of latching relay 74, controls illumination of light-emitting diode 28 which is illuminated when a cassette recorder/player is operative and the latching relay is in a release, or reset, position. Power is supplied to the light-emitting diodes through line 144 to negative power supply line 62 and line 116 to positive power supply line 60.

To dissuade the student from removing remote power control plug 14 from a cassette recorder/player's "remote power" jack, causing the recorder/player to be actuated and, thereby, allowing sound to be heard through headphones while the teaching machine is in a latch, or "stop," position, switch 146, which comprises one set of contacts of release coil 136 of latching relay 74, controls sound conducted to jacks 64 and 38. When relay 74 is in a latched position, switch 146 is open and no audio signal can reach headphone output jack 64 or monitor output jack 38. Diodes 148 and 150, which are connected across the coils of relay 74, are for the purpose of arc suppression, particularly the radiation of transient voltages which can cause false triggering of logic circuitry comprising a timed sequencing switch which will later be described with reference to FIG. 5.

Again referring to FIG. 6, leads 152 and 154 are parallel connected to audio input, 12, allowing an audio signal to be transferred by an audio transformer 156 to amplification and switching circuitry of a volume control relay. A trimmer potentiometer 158 is provided at the circuit input to allow for sensitivity adjustment, causing a relay to be energized when audio peaks entering the circuit indicate a volume unit level of 0 dB or higher on VU meter 30. Capacitor 160 and resistor 162 comprise an RC time delay which controls the holding period of the circuit's relay. The unfiltered audio signal is rectified by diode 164 and amplified by PNP transistor 166, which, in turn, is coupled with PNP transistor 168 in the Darlington configuration. With this arrangement, any sound of sufficient volume which is reproduced by a cassette recorder/player will cause transistor 168 to be forward biased into conduction, allowing sensitive relay coil 170 to be energized. Power is supplied to coil 170 by positive supply line 60 through line 116 and transistor 168 to line 172 and negative power supply line 62. Diode 174 is connected across the relay coil to provide arc suppression.

Switch 176, which comprises a set of normally closed contacts of relay 170, controls a power circuit to coil 120 of latching relay 74, causing relay 74 to latch unless relay coil 170 is energized. Power is supplied to latch coil 120 of relay 74 by positive supply line 60 through line 116, line 114, line 126, switch 124, and line 122 to line 178, switch 176, line 180, and negative power supply line 62. A function of volume control relay 170 is to cause coil 120 of relay 74 to latch unless sound of sufficient volume, as provided by a taped programmed lesson, enters the circuit. It will, therefore, be appreciated that volume control relay 170 will cause the teaching machine to latch in a stop position, thereby deactivating the playback mechanism of a recorder/player, if the student attempts to prevent recorded tone control signals from reaching the teaching device by lowering the recorder/player's volume. If this occurs, a null panel must be used to reactivate the cassette recorder/player.

To prevent the teaching machine from deactivating a cassette recorder/player during brief pauses in a programmed lesson tape, capacitor 160 and resistor 162 effect a time delay circuit which maintains relay coil 170 in an energized state for several seconds following each audio peak, thus not allowing relay 74 to latch. Means are also provided to maintain the teaching machine in a reset, "go" mode for a brief period of time after which a null panel has been utilized to activate a tape recorder/player which is not yet reproducing sound and which has not has its volume control adjusted to the correct level. Line 182, which terminates at one point at resistor 162 of the volume control relay circuit, is connected through a normally open circuit of answer switch 26 to negative power supply line 62, which is illustrated in FIG. 4. After a null panel has been inserted into a frame of the teaching device and a zero alphanumeric switch has been depressed, the student must also depress answer switch 26 to actuate the recorder/player. When this is done, a negative impulse is conducted through line 182 to the circuit of volume control relay 170, causing relay coil 170 to be energized which, in turn, prevents relay 74 from latching for several seconds. This brief time delay period allows a recorder/player to assume control of the volume control relay circuit while recorder/player volume control adjustment is completed.

Additional means are provided to prevent relay 74 from latching when a recorder/player is deactivated by hold switch 34, which, as has been described, is provided to allow the student to temporarily leave the teaching machine in order to return a null panel to its storage location. Line 184, which also terminates at resistor 162 of the volume control relay circuit, is connected through circuit B of hold switch 34 to negative power supply line 62, as illustrated in FIG. 4. When hold switch 34 is turned on, line 184 provides driver transistor 166 of the volume control relay circuit with continuous forward bias, causing relay coil 170 to be energized, thereby preventing relay 74 from latching.

Referring now to FIG. 4, ten momentary push button switches which comprise a portion of the teaching machine's response circuitry are illustrated. The first terminal of each of the ten alphanumeric switches 24-A-J is connected to bus 186, which, in turn, is connected to negative power supply line 62 through a normally open roller lever snap-action switch 188 and a normally closed momentary push button answer switch 26. The second terminal of switches 24-A-J is parallel connected to matching roller lever snap-action switches in each of three switch matrices 52-A, 52-B, and 52-C. In the case of units switch matrix 52-A, however, a rotary mode switch 36 is provided to connect each of the alphanumeric switches (except switch 24-J) with one of three snap-action switches, depending on the position of the rotary switch. For example, position, or mode, A connects alphanumeric switch 24-A with snapaction switch 52-A-1, thereby assigning a value of 1 to snap-action switch 52-A-1 and to a spatially corresponding depression contained in an interrogation panel. Mode B connects alphanumeric switch 24-A with snap-action switch 52-A-2, thereby assigning a value of 1 to switch 52-A-2 rather than to switch 52-A-1. Mode C connects alphanumeric switch 24-A with snap-action switch 52-A-3, thereby assigning a value of 1 to snap-action switch 52-A-3 and to a spatially corresponding depression contained in an interrogation panel. With the utilization of a 9-pole, 3 positions per pole rotary switch, each of the alphanumeric switches, except 24-J, is, therefore, associated with three snap-action switches and, consequently, three positions on an interrogation panel. The purpose of mode switch 36 is to dissuade the student from attempting to memories values assigned to coded depressions of an interrogation panel. Zero alphanumeric switch 24-J is connected directly to snap-action switch 52-A-O, which allows a zero-coded null panel to actuate a cassette recorder/player regardless of the position of the pointer knob of mode switch 36.

The output terminal of each of ten normally closed roller lever snapaction switches comprising switch matrix 5-A is connected to bus 190 which terminates at the trigger of the first of three integrated circuits comprising a portion of a timed sequencing switch, which will be described with reference to FIG. 5. Lines 192, 194, 196, 198, 200, 202, 204, 206, 208, and 210 conduct response impulses from alphanumeric switches 24-A-J to switch matrices 52-B and 52-C.

With reference to FIG. 5, an output terminals of each of ten normally closed roller lever snap-action switches comprising switch matrix 52-B is connected to bus 212, which is controlled by NPN transistor 214 and which terminates at the trigger of a second IC timer. The output terminals of switches 52-C are connected to bus 216, which is controlled by NPN transistor 218 and which terminates at the trigger of a third IC timer.

A preferred embodiment of the present invention utilizes three 555 integrated circuits, which are well-known in the prior art, to comprise a portion of a timed sequencing switch 220. The purpose of switch 220 is to sequence, in left to right order, all response impulses conducted from alphanumeric switches 24-A-J, and to time the effective conduction period as triggered by the impulses. Power is supplied to timed sequencing switch 220 through lines 132 and 222.

Function of timed sequencing switch 220 can best be illustrated by returning to an example previously cited. In this example the student is asked by an interrogation panel, which has been inserted into a frame of the teaching machine, to compute the sum of 42 + 28 + 54 and communicate his response to the teaching machine. The correct response is, of course, 124. The student will, therefore, first depress alphanumeric switch 24-A, which is illustrated in FIG. 4. The impulse will be conducted through mode switch 36 to one of three snap-action switches in switch matrix 52-A, depending on the position of mode switch 36, and, consequently, to bus 190 of switch matrix 52-A, thereby triggering IC 224 which functions as a monostable multivibrator and which contains appropriate external timing circuitry (not shown) and switching circuitry. In the present invention, an external resistor and capacitor comprise an RC circuit which effects a time delay of 2.4 seconds. The triggering of IC 224 will, therefore, forward bias transistor 214 into conduction for 2.4 seconds.

Next, the student will depress alphanumeric switch 24-B, which conducts an impulse through line 208 to snap-action switch 52-B-2 and, thence, to bus 212 of switch matrix 52-B. Bus 212 is connectd through the emitter and collector of transistor 214 to the trigger of IC 226. If the student has depressed switch 24-B while transistor 214 is still conducting, the impulse will cause IC 226 to be triggered, thereby causing transistor 218 to be forward biased into conduction. Since transistor 218 is controlled by an IC containing the same RC time delay circuitry as described for IC 224, transistor 218 will conduct for 2.4 seconds.

Last of all, the student will depress alphanumeric switch 24-D, which conducts an impulse through line 204 to snap-action switch 52-C-4, and, thence, to bus 216 of switch matrix 52-C. Bus 216 is connected through the emitter and collector of transistor 218 to the trigger of IC 228. If the student has depressed switch 24-D while transistor 218 is still conducting, the impulse will cause IC 228 to be triggered, thereby causing transistor 230 to be forward biased into conduction. Since transistor 230 is controlled by an IC containing the same RC time delay circuitry as described for IC 224, transistor 230 will also conduct for 2.4 seconds.

To finally reactivate a tape recorder/player which has been previously deactivated by a recorded control signal, the student depresses answer switch 26 (illustrated in FIG. 4). A complete circuit is, thus, made between negative power supply line 62, switch 26, and line 182 through transistor 230 to release coil 136 of relay 74 (illustrated in FIG. 6), which, in turn, is connected to positive power supply line 60. Actuation of a cassette recorder/player is achieved by the closing of contacts in switch 72, which, as previously described, comprises one set of contacts of latching relay 74.

It will be appreciated that each interrogation panel of the present invention contains three coded depressions which allow three snap-action switches within switch matrices 52-a, 52-B, and 52-C to retain their normally closed position. If, for example, a correct response of 124 is required by an interrogation panel, the panel will contain a shallow depression corresponding to the 1 snap-action switch position in switch matrix 52-A, a shallow depression corresponding to the 2 snap-action switch position in switch matrix 52-B, and a shallow depression corresponding to the 4 snap-action switch position in switch matrix 52-C. In this example, all snap-action switches, except the above three, are open because of downward pressure exerted on the switch levers by an interrogation panel when it has been inserted into frame 16. An interrogation panel requiring a two-digit or two-letter response will contain three depression to allow three snap-action switches to remain closed, but the second and third depressions will be of the same numerical value or letter. For example, an interrogation panel requiring a response 10 would be coded 1-0-0, so that an impulse conducted by zero alphanumeric switch 24-J is allowed to pass through snap-action switches 52-B-O and 52-C-O simultaneously, thus, causing both IC 226 and IC 228 to be triggered. An interrogation or mull panel requiring a single digit or letter response contains three depressions which are all of the same numerical value or letter. The null panel, for example, is coded 0-0-0 so that a single depression of alphanumeric switch 24-J causes an impulse to be simultaneously conducted through switch matrices 52-A, 52-B, and 52-C to IC's to 224, 226, and 228, which are triggered and, thus, cause transistor 230 to be forward biased into conduction. Answer switch 26 is then depressed to actuate a cassette recorder/player.

A two-circuit momentary push button switch is utilized for answer switch 26 (FIG. 4) to prevent the student from randomly depressing alphanumeric switches until a recorder/player is actuated. No alphanumeric response can be communicated to the teaching machine while answer switch 26 is depressed. Monostable multivibrators, rather than bistable multivibrators, are utilized in timed sequencing switch 220 (FIG. 5) to also prevent guessing. Since the IC's will revert to their stable state within a very brief time period, thus reverse biasing transistors 214, 218, and 230, the student will have little opportunity for guesswork. Snap-action switch 188 (FIG. 4), which is normally open and which conducts power to the response circuitry, is utilized to prevent a tape recorder/player from being actuated when no interrogation panel is present in frame 16. Power can be conducted to the teaching machine's response circuitry only when an interrogation panel is present within the frame, whereby the downward pressure exerted by the panel on the lever of switch 188 causes the switch to close.

While the teaching machine of the present invention has been described in a preferred embodiment, it should be understood that various modifications and substitutions can be made without departing from the spirit of the invention. For example, rotary switches can be provided in place of alphanumeric push button response switches. Three single pole, ten position rotary switches can be provided, whereby each position of each rotary switch is identified with a consecutive number, the first position being identified as 1, the second being identified as 2, and so on, with the tenth position being identified as 0, and whereby each position of each rotary switch is also identified with groups of consecutive letters of the alphabet, the first position being identified as A,B,C, the second position being identified as D,E,F, and so on, with the tenth position being identified as Y,Z. Utilization of alphanumeric rotary response switches would, of course, obviate the need for a timed sequencing switch, such as has been described in a preferred embodiment of the present invention. It is contemplated that alphanumeric rotary response switches would be highly apropos for the primary grades, since there would be no time limit in responding with the rotary switches, and the student would have continuous visual reinforcement of those response elements he has chosen to communicate to the teaching device.

Although panel-sensing circuitry of the present invention utilizes electricalmechanical means, it is contemplated that other means, such as photocell or magnetic, could be utilized.

The terms and expressions which has been employed in the foregoing drawings, abstract, and specification are used therein as terms of description and not of limitation; it being understood that changes may be made in the embodiments disclosed without departing from the spirit and scope of the invention as defined in the following claims.

What is claimed is:

1. A portable, self-powered teaching machine for presenting audio instruction and non-multiple choice student evaluation comprising in combination: recorded sound producing means and a sound record for reproducing both audio instruction and sound producing means control signals recorded thereon; audio frequency detection and switching means to deactivate said sound producing means and sound record in response to said sound producing means control signals recorded on said sound record; audio frequency detection and switching means to deactivate said sound producing means and sound record in response to student circumvention of said sound producing means control signals by manual reduction of volume of said sound producing means; a plurality of interchangeable, coded panels displaying interrogative visual information arranged to be manually synchronized with audio instruction of said sound record; sensing means which interact with said coded panels when panels are inserted into a display area on the teaching machine's surface, thereby establishing a singular, correct student response circuit; and a plurality of student controlled switching means, each switch being identified with one or more letters of the alphabet and one or more digits, thereby allowing communication of any letter of the alphabet, A through Z, and any of the digits, 0 through 9, causing said sound producing means and sound record to be actuated by proper manipulation of said switches in response to interrogative visual information of said interchangeable panels, whereby a correct response may consist of switch manipulation to identify in the proper order the exact letters of a word, portion of a word, a numerical value, or portion of a numerical value without reference to multiple choice identification.

2. The teaching machine of claim 1 wherein one of said interchangeable, coded panels is retained under instructor supervision and bears known coded indicia, thereby functioning as an actuation "key" which establishes a known response circuit, thereby allowing said sound producing means and sound record to be actuated by a given and known manipulation of said student controlled switching means, as may be necessary when the teaching machine is initially energized or when said interrogative visual information posed by said interchangeable, coded panels cannot be correctly answered.

3. A portable, self-powered teaching machine for presenting audio instruction and non-multiple choice student evaluation comprising in combination: recorded sound producing means, said sound producing means including a sound reproducing transducer to provide and amplify an audio signal input; a single channel sound record for reproducing both audio instruction and sound producing means control signals recorded thereon; audio frequency detection and switching means to deactivate said sound producing means and sound record in response to said sound producing means control signals recorded on said sound record; audio frequency detection and switching means to deactivated said sound producing means and sound record in response to student circumvention of said sound producing means control signals by manual reduction of volume of said sound producing means; a plurality of interchangeable, coded panels displaying interrogative visual information arranged to be manually synchronized with audio instruction of said sound record; sensing means which interact with said coded panels when panels are inserted into a display area on the teaching machine's surface, thereby establishing a singular, correct student response circuit; and a plurality of student controlled switching means, each switch being identified with one or more letters of the alphabet and one or more digits, thereby allowing communication of any letter of the alphabet, A through Z, and any of the digits, 0 through 9, causing said sound producing means and sound record to be actuated by proper manipulation of said switches in response to interrogative visual information of said interchangeable panels, whereby a correct response may consist of switch manipulation to identify in the proper order the exact letters of a word, portion of a word, a numerical value, or portion of a numerical value without reference to multiple choice identification.

4. The teaching machine of claim 3 wherein said student controlled switching means comprise a plurality of momentary switches, each switch being identified with one or more letters of the alphabet and one or more digits, thereby allowing communication of any letter of the alphabet, A through Z, and any of the digits, 0 through 9, causing said sound producing means and sound record to be actuated by proper manipulation of said switches in response to interrogation visual information of said interchangeable panels, whereby a correct response may consist of switch manipulation to identify in the proper order the exact letters of a word, portion of a word, a numerical value, or portion of a numerical value without reference to multiple choice identification.

5. The teaching machine of claim 3 wherein said student controlled switching means comprise a plurality of rotary switches, each switch being identified with one or more letters of the alphabet and one or more digits, thereby allowing communication of any letter of the alphabet, A through Z, and any of the digits, 0 through 9, causing said sound producing means and sound record to be actuated by proper manipulation of said switches in response to interrogative visual information of said interchangeable panels, whereby a correct response may consist of switch manipulation to identify in the proper order the exact letters of a word, portion of a word, a numerical value, or portion of a numerical value without reference to mulitple choice identification.

6. A portable, self-powered teaching machine for presenting audio instruction and non-multiple choice student evaluation comprising in combination: recorded sound producing means, said sound producing means including sound reproducing transducers to provide and amplify audio signal inputs; a plural channel sound record for reproducing both audio instruction and sound producing means control signals recorded thereon; audio frequency detection and switching means to deactivate said sound producing means and sound record in response to said sound producing means control signals recorded on said sound record; audio frequency detection and switching means to deactivate said sound producing means and sound record in response to student circumvention of said sound producing means control signals by manual reduction of volume of said sound producing means; a plurality of interchangeable, coded panels displaying interrogative visual information arranged to be manually synchronized with audio instruction of said sound record; sensing means which interact with said coded panels when panels are inserted into a display area on the teaching machine's surface, thereby establishing a singular, correct student response circuit; and a plurality of student controlled switching means, each switch being identified with one or more letters of the alphabet and one or more digits, thereby allowing communication of any letter of the alphabet, A through Z, and any of the digits, 0 through 9, causing said sound producing means and sound record to be actuated by proper manipulation of said switches in response to interrogation visual information of said interchangeable panels, whereby a correct response may consist of switch manipulation to identify in the proper order the exact letters of a word, portion of a word, a numerical value, or portion of a numerical value without reference to multiple choice identification.

7. The teaching machine of claim 6 wherein said student controlled switching means comprise a plurality of momentary switches, each switch being identified with one or more letters of the alphabet and one or more digits, thereby allowing communication of any letter of the alphabet, A through Z, and any of the digits 0 through 9, causing said sound producing means and sound record to be actuated by proper manipulation of said switches in response to interrogative visual information of said interchangeable panels, whereby a correct response may consist of switch manipulation to identify in the proper order the exact letters of a word, portion of a word, a numerical value, or portion of a numerial value without reference to multiple choice identification.

8. The teaching machine of claim 6 wherein said student controlled switching means comprise a plurality of rotary switches, each switch being identified with one or more letters of the alphabet and one or more digits, thereby allowing communication of any letter of the alphabet, A through Z, and any of the digits, 0 through 9, causing said sound producing means and sound record to be actuated by proper manipulation of said switches in response to interrogative visual information of said interchangeable panels, whereby a correct response may consist of switch manipulation to identify in the proper order the exact letters of a word, a portion of a word, a numerical value, or portion of a numerical value without reference to mulitple choice identification.

* * * * *

UNITED STATES PATENT AND TRADEMARK OFFICE
CERTIFICATE OF CORRECTION

PATENT NO. : 4,035,929

DATED : July 19, 1977

INVENTOR(S) : James W. Groff

It is certified that error appears in the above-identified patent and that said Letters Patent is hereby corrected as shown below:

In the abstract, column 2, line 16, "manner" should read -- answer --.

Column 1, line 26, "known" should read -- know --.

Column 2, lines 9, 10, 11 and 12, "so sentence reads" "The invention provides audio detection and switching means so sentence reads "The invention provides audio detection and switching means which respond to tone control..!" should be deleted.

Column 2, line 17, "determone" should read -- determine --.

Column 4, line 56, "One" should read -- Once --.

Column 5, line 8, "it" should read -- It --.

Column 5, line 61, "manipulated" should read -- manipulation --.

Column 5, line 62, "23-" should read -- 24- --.

Column 5, line 64, "-j" should read -- -J --.

Column 6, line 4, "(124)" should read -- (124) --.

Column 7, line 38, "depression" should read -- depressions --.

Column 7, line 44, "causes" should read -- caused --.

Column 7, line 60, "swithes" should read -- switches --.

Column 8, line 24, "buttom" should read -- button --.

Column 9, line 12, "recorder" should read -- recorded --.

Column 10, line 11, "," should read -- . --.

Column 10, line 21, "amplifier" should read -- amplified --.

Column 12, line 66, "memories" should read -- memorize --.

Column 13, line 6, "5-A" should read -- 52-A --.

UNITED STATES PATENT AND TRADEMARK OFFICE
CERTIFICATE OF CORRECTION

PATENT NO. : 4,035,929                          Page 2 of 2

DATED : July 19, 1977

INVENTOR(S) : James W. Groff

It is certified that error appears in the above-identified patent and that said Letters Patent is hereby corrected as shown below:

```
Column 13, line 13, "terminals" should read -- terminal --.
Column 14, lines 33 and 34, "depression" should read -- depressions --.
Column 14, line 37, "10" should read -- "10" --.
Column 14, line 42, "mull" should read --null --.
Column 16, lines 33 and 34, "deactivated" should read -- deactivate --.
Column 16, line 66, "interrogation" should read -- interrogative --.
Column 18, line 6, "interrogation" should read -- interrogative --.
```

Signed and Sealed this

Twenty-second Day of March 1983

[SEAL]

Attest:

GERALD J. MOSSINGHOFF

*Attesting Officer*           *Commissioner of Patents and Trademarks*